United States Patent
Kraus et al.

(10) Patent No.: US 8,977,904 B2
(45) Date of Patent: Mar. 10, 2015

(54) GENERATING A REPLAYABLE TESTING SCRIPT FOR ITERATIVE USE IN AUTOMATED TESTING UTILITY

(75) Inventors: Moshe Eran Kraus, Mazkeret Batya (IL); Lior Manor, Alfei Menashe (IL); Amichai Nitsan, Rehovot (IL); Meidan Zemer, Hod-Hasharon (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 376 days.

(21) Appl. No.: 13/398,888

(22) Filed: Feb. 17, 2012

(65) Prior Publication Data

US 2013/0219220 A1 Aug. 22, 2013

(51) Int. Cl.
*G06F 11/00* (2006.01)

(52) U.S. Cl.
USPC .................. 714/33; 714/25; 714/27; 714/28; 714/32; 714/38.1; 717/124; 717/134

(58) Field of Classification Search
USPC ........... 714/25, 27, 28, 32, 33, 38.1; 717/124, 717/134
See application file for complete search history.

(56) References Cited

U.S. PATENT DOCUMENTS

| | | | |
|---|---|---|---|
| 6,321,347 B1 * | 11/2001 | Beeker et al. | 714/28 |
| 6,587,543 B1 * | 7/2003 | Howard et al. | 379/10.01 |
| 7,793,154 B2 * | 9/2010 | Chagoly et al. | 714/38.14 |
| 8,543,983 B2 * | 9/2013 | Murthy | 717/125 |
| 2003/0103310 A1 | 6/2003 | Shirriff | |
| 2007/0022406 A1 * | 1/2007 | Liu | 717/124 |
| 2008/0133210 A1 * | 6/2008 | Chagoly et al. | 703/22 |
| 2010/0153529 A1 * | 6/2010 | Moser | 709/223 |
| 2011/0022899 A1 | 1/2011 | Greenberg et al. | |
| 2011/0173526 A1 * | 7/2011 | Schwarzbauer et al. | 715/234 |
| 2012/0253745 A1 * | 10/2012 | Dhanapal et al. | 702/186 |
| 2013/0159974 A1 * | 6/2013 | Norton et al. | 717/124 |

OTHER PUBLICATIONS

Parameterization in Load Runner; Mercury Interactive, Nov. 25, 2002.
LoadRunner—Creating Vuser Scripts Using Windows and UNIX V; Version 7.51, Feb. 7, 2009.

* cited by examiner

*Primary Examiner* — Joshua P Lottich
(74) *Attorney, Agent, or Firm* — Pearle Cohen Zedek Latzer LLP

(57) ABSTRACT

A method for generating a replayable testing script for iterative use by an automated testing utility may include recording a plurality of scripts, each script relating to a separate iteration of a transaction between a user and a tested application performed by an operator. The method may also include comparing the recorded scripts to identify a location of a data item by finding different values in a pair of corresponding locations in the recorded scripts, indicative of a dynamic data item. The method may further include generating the replayable testing script comprising one of the recorded scripts and having a variable parameter at the identified location of the dynamic data item.

17 Claims, 3 Drawing Sheets

GENERATING A REPLAYABLE TESTING SCRIPT FOR ITERATIVE USE IN AUTOMATED TESTING UTILITY

BACKGROUND

Automated performance and testing utilities are known for examining system behavior and performance.

Such utilities typically emulate numerous concurrent users so as to interact with and strain the tested application. Such emulation may be used, for example, for generating loads on the application, for testing the functionality of the application, for testing web services and for monitoring the proper execution of a running application. Information collected from infrastructure components of the system (e.g., local servers, web servers, database servers etc.) may be thus analyzed to explore the behavior of the system.

In some examples, a real user performs a transaction with the tested application and a script of the communication traffic between the user and the tested application corresponding with that transaction is recorded. The recorded script may then be played back when emulating multiple users.

Most web applications, e.g., Web 2.0, use dynamic data that depends on the server responses (such as for example, session ID) to send information back to the server. This requires the performance engineer or technician attending to this to correlate the relevant pieces of the data that is being sent with server response.

BRIEF DESCRIPTION OF THE DRAWINGS

Examples are described in the following detailed description and illustrated in the accompanying drawings in which.

DETAILED DESCRIPTION

Figure 1:
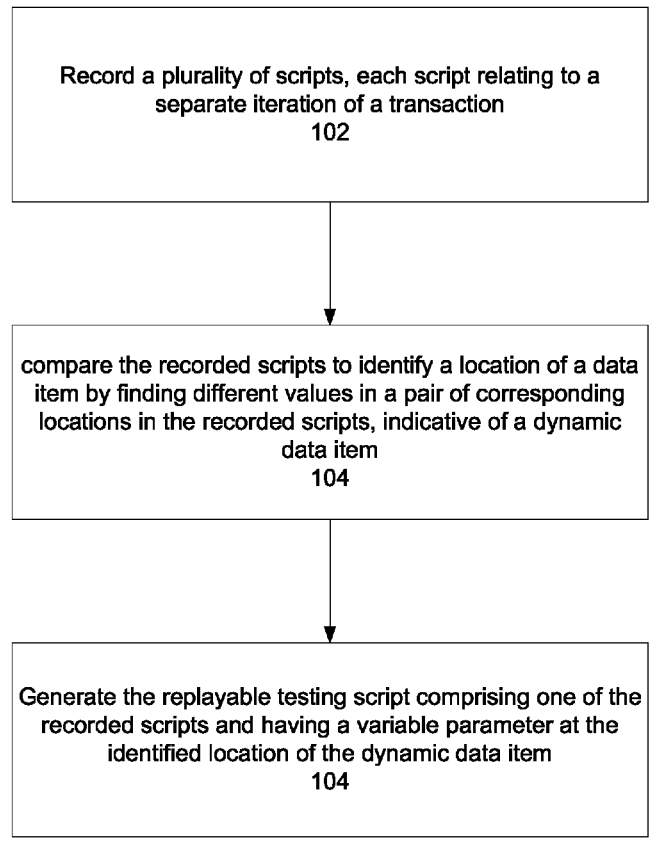
FIG. 1 illustrates a method for generating a replayable testing script for iterative use by an automated testing utility, in accordance with an example.

In the following detailed description, numerous specific details are set forth. However, it will be understood by those skilled in the art that examples may be practiced without these specific details. In other instances, well-known methods, procedures, and components have not been described in detail so as not to obscure the discussed examples.

Although examples are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

"Tested application", in the context of the present specification, may refer to any application undergoing testing, such as, for example, load testing, functionality testing, web services testing and monitoring the proper execution of a running application.

"User", in the context of the present specification, may refer to any source of a request that is communicated to the tested application. This may include, for example, a local or remote client, a web browser, etc. In some examples, "user" may be a local or remote server sending a request to the tested application.

"Recording", in the context of the present specification, may refer to any acquired representation of communication traffic that occurred between a user and the tested application, which may be obtained using various acquisition techniques. For example, if the server software supports a method to retrieve all the HTTP requests it has sent, or received, the generated script may be considered as a "recording" of the sent or received HTTP requests.

"Request" and "Response", in the context of the present specification, may refer to any kind of datagram communication that was sent or received and a corresponding datagram communication received or sent in response. The "request" or "response" may be related to a user interacting with the tested application, or to a server running the tested application. In some examples, "request" or "response" may be related to non client-server communication (for example, in code, when function A calls function B, etc., when it is desired to mock function A for any reason, and correlation is needed). Such datagram may include, for example, a datagram compliant with HTTP protocol or other non-HTTP protocols.

"Script", in the context of the present specification, may refer to any form of script. For example, a "script" may be an editable or non-editable text script, plain list of requests, and any other form of representation of the communication traffic to or from a source of communication.

"Correlation value", in the context of the present specification may refer to a value assigned to a specific data item, which is obtained, in a current iteration of a transaction interaction between the user and the tested application, in a response or presented in a request, and which is to be reused in a consequent request or response (respectively), in that current iteration. The correlation value is typically unique for that iteration. In another iteration of the transaction interaction a different value is likely to be assigned to that specific data item.

"Value", in the context of the present specification may refer to any alphanumerical value, e.g. a string of numbers or characters, or a combination thereof, or single digits or characters, etc.

Typically, a transaction between a user and an application involves sending one or more requests and receiving one or more responses to these requests. The responses may include dynamic data items. When reiterating a transaction, responses relating to different iterations of the transaction may include different values for corresponding dynamic data items.

Two types of parameters may be involved in a transaction of a user with a tested application: input parameters and output parameters. Input parameters are those which are read from a data table (which may be used by the user to conveniently specify data sets for running multiple iterations of a test) during execution, and are used (a) to send data to the server and (b) for verification. Output parameters are used (a) to hold data values returned by the server, (b) for verification, and (c) for correlation.

Output parameters may be used as correlation values by including the output value location, which indicates the source of the data, in a data spreadsheet such that a data value from a first screen is used in a second screen or in another step of the same screen.

To-date, when setting an automated testing utility to work an IT technician, or another human operator, would typically perform a single session of a transaction with the tested application. A transaction script of the communication traffic between the user and the tested application relating to that transaction would be recorded.

Then, the recorded script would be replayed to the tested application emulating a user performing that transaction with the tested application. However, when dynamic data items are present, the replay iteration would fail on the first instance of such dynamic data item, as the replayed script includes a value for that data item that was recorded in a previous iteration which may therefore be an incorrect value.

The failed execution would lead to identifying that data item as a dynamic data item, and finding the correct value for that data item by referring to the corresponding data item in the response (or responses) received in the present replay iteration. Then recorded script would then be replayed again, and if another dynamic data item existed that again the replayed iteration would fail leading to finding the correct value for the other data item in the response (or responses) received in that replay iteration and using it in another replay iteration. This would be repeated until all dynamic data items are identified, allowing the following replay iteration to successfully complete the transaction.

Replaying scripts to find correlation values may be time consuming and frustrating, and may be an error prone process. Each correlation value must be handled separately and accurately.

In accordance with an example, a method 100 (See FIG. 1) for generating a replayable testing script for iterative use by an automated testing utility may include recording 102 a plurality of scripts (e.g., two or more scripts), each script relating to a separate iteration of a transaction between a user and a tested application performed by an operator. In some examples the operator may be instructed to perform separate iterations of transactions between the user and the tested application. In some examples the operator may be prompted to perform the separate iterations.

Method 100 may also include comparing 104 the recorded scripts to identify a location of a data item by finding different values in a pair of corresponding locations in the recorded scripts, indicative of a dynamic data item.

Method 100 may further include generating 106 the replayable testing script comprising one of the recorded scripts and having a variable parameter at the identified location of the dynamic data item.

The variable parameter may receive, for each iteration of the replayable testing script, a current value received in a current request or response or present that value in a consequent response or request.

Figure 2:
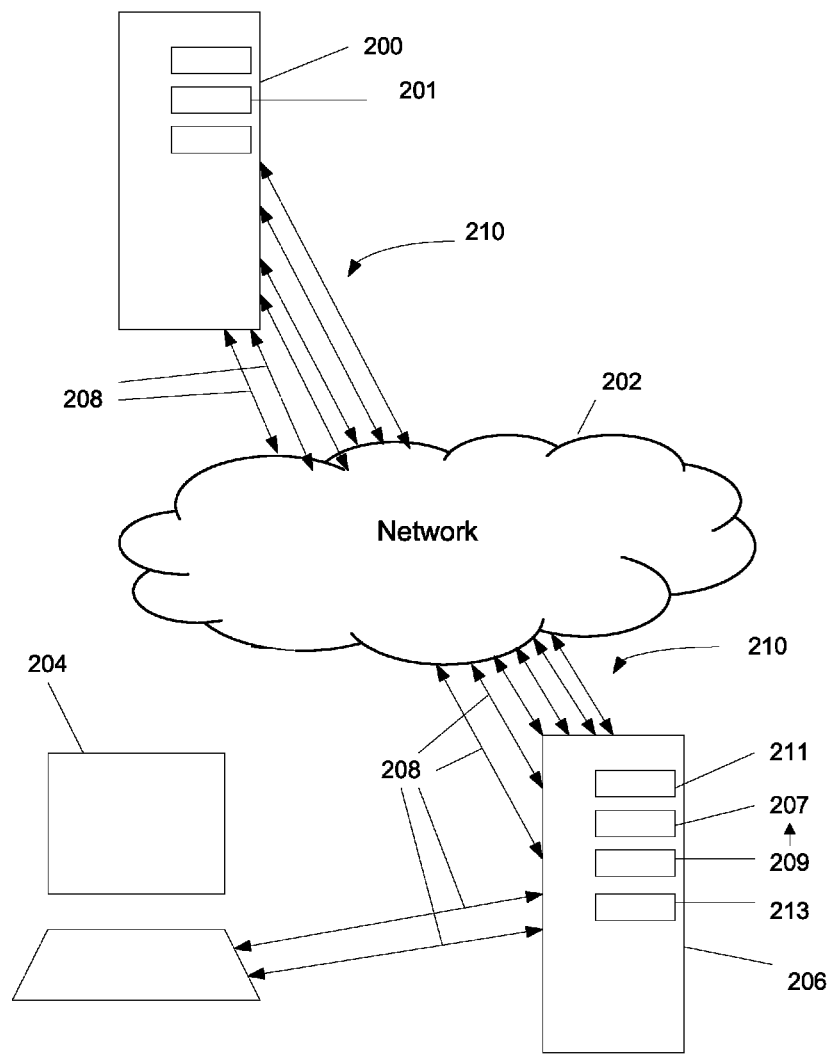
FIG. 2 illustrates a system for automated testing with a module for generating a replayable testing script for iterative use by the automated testing utility, in accordance with an example.

FIG. 2 illustrates a system for automated testing with a module for generating a replayable testing script for iterative use by the automated testing utility, in accordance with an example. An automated testing utility 207 may be executed on testing server 206 to test an application 201 running on application server 200. The testing server 206 and the application server 200 may communicate directly or over a network 202. Testing server 206 may include a processor 211, for executing computer executable commands of a program for generating a replayable testing script for iterative use by an automated testing utility, in accordance with an example. Testing server 206 may also include non-transitory computer readable medium 213, such as, for example, a hard disk drive, for storing computer executable instructions of a program for generating a replayable testing script for iterative use by an automated testing utility, in accordance with an example.

A user 204 may interact with the tested application 201 by performing a transaction, such as a business process. In accordance with an example, an operator may be prompted to perform two or more independent sessions 208 of the transaction between the 204 user and the tested application 201.

Scripts of the two or more independent sessions 208 of the transaction may be recorded Module 209 for generating a replayable testing script for iterative use by an automated testing utility may compare the recorded scripts to identify a location of a data item by finding different values in a pair of corresponding locations in the recorded scripts, indicative of a dynamic data item. Module 209 may also generate a replayable testing script. The replayable testing script may include either of the recorded scripts, where, in the identified location of the dynamic data item a variable parameter is placed. The variable parameter is used to obtain, in each replay of the replayable testing script a current value received in a current request or response or present this value as a correlation value in a consequent response or request.

For example, in a web-based implementation, module 209 for generating a replayable testing script for iterative use by an automated testing utility may record or obtain from another module of the testing utility or other recording device a plurality of recorded interactions between a web browser and a web server, including link selections and form submissions made by the user, and pages returned by the server. Then module 209 may compare the recorded scripts to identify the locations of dynamic data items and generate, based on the identified locations of the dynamic data items a replayable testing script in which variable parameters are placed in the replayable testing script. The variable parameters may be used to obtain current values for each replay of the replayable testing script During replay of the generated replayable testing script, which may occur in either an attended or unattended mode, the automated testing utility 107 may play back the generated replayable testing script while monitoring and recording the responses of the transactional server. The results of the each iteration of the test, including the results of the verification steps, may be stored.

According to some examples, correlation values of dynamic data items may be presented to the user 204.

Figure 3:
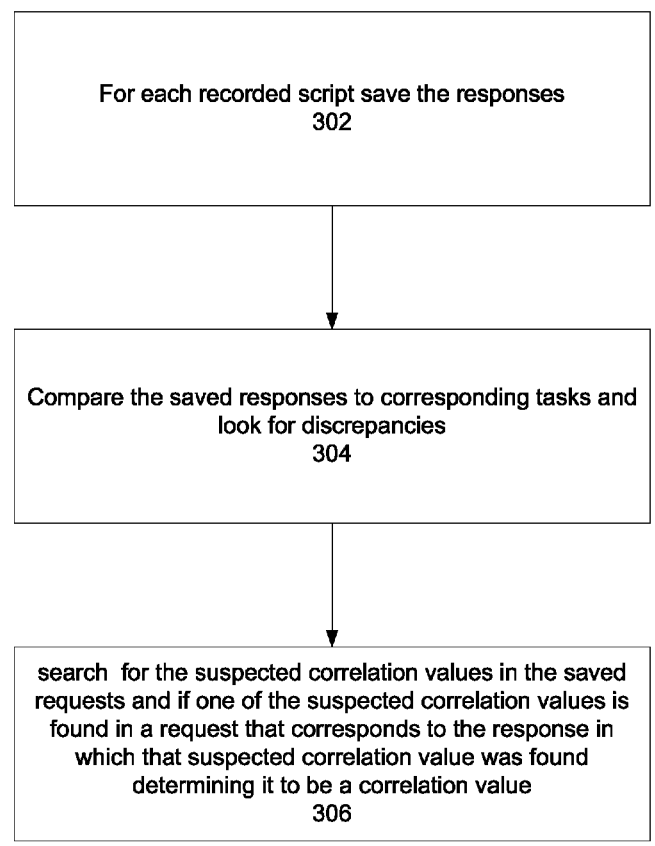
FIG. 3 illustrates a dynamic data item finding algorithm according to an example.

According to an example, a dynamic data item finding algorithm 300 is illustrated in FIG. 3, which may be embedded in and used by an automated testing utility.

During the recording phase, and for each recorded script (e.g. the first and second scripts), responses may be saved 302. The saved responses may include transported data of each HTTP request and corresponding response transaction (HTTP Task).

The dynamic data item finding algorithm may also include comparing 304 the saved responses to corresponding tasks and looking for discrepancies. This may involve, for example, using one of the following techniques: (i) string comparison (LCS) (ii) HTML comparison.

All the discrepancies may be regarded as suspected correlation values corresponding to dynamic data items.

The dynamic data item finding algorithm may further include searching 306 for the suspected correlation values in the saved requests (i.e. in the recorded script) and if one of the suspected correlation values is found in a request that corresponds to the response in which that suspected correlation value was found determining it to be a correlation value.

Thus the location of the determined correlation value in the script may be determined as the location of a dynamic data item.

The automated testing utility may thus test the tested application by replaying the replayable testing script. In each replay of the test the appropriate correlation value may be used by retrieving the assigned value of each dynamic data item obtained in a request or response in the current replay session and using that value in a consequent response or request (respectively) in that session.

The automated performance and testing utility, in accordance with examples, may use the determined correlation values in replays, presenting the correlation values as responses to relevant requests.

Determining correlation values in accordance with examples, can be more efficient, and require less manual work by operators. The operator is not required to iteratively replay the script until all correlation values are found, as the dynamic data items may be determined from the recorded scripts.

Comparing two recorded scripts, in accordance with examples, instead of replaying a script which was recorded once, allows time to be saved (the time it takes to replay the script again and again until the user can successfully find all correlations). Manual work of operators may be avoided, as all the correlation values may be determined automatically.

Examples may be embodied in the form of a system, a method or a computer program product. Similarly, examples may be embodied as hardware, software or a combination of both. Examples may be embodied as a computer program product saved on one or more non-transitory computer readable medium (or mediums) in the form of computer readable program code embodied thereon. Such non-transitory computer readable medium may include instructions that when executed cause a processor to execute method steps in accordance with examples. In some examples the instructions stores on the computer readable medium may be in the form of an installed application and in the form of an installation package.

Such instructions may be for example loaded into one or more processors and executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer, or on a plurality of computers.

Examples are described hereinabove with reference to flowcharts and/or block diagrams depicting methods, systems and computer program products according to examples.

What is claimed is:

1. A method for generating a replayable testing script for iterative use by an automated testing utility, the method comprising:
   recording a plurality of scripts, each script relating to a separate iteration of a transaction between a user and a tested application performed by an operator, each script comprising a request and a response;
   comparing the recorded scripts to identify a location of a data item by finding different values in a pair of corresponding locations in the recorded scripts, indicative of a dynamic data item, including comparing responses to corresponding tasks in the recorded scripts and identifying discrepancies which are regarded as suspected correlation values;
   identifying one of the suspected correlation values in a request in a script that corresponds to the response in which that suspected correlation value was found and determining that suspected correlation value to be a correlation value; and
   generating the replayable testing script comprising one of the recorded scripts and having a variable parameter at the identified location of the actual correlation value.

2. The method of claim 1, further comprising replaying the replayable testing script to test the tested application.

3. The method of claim 2, further comprising retrieving an assigned value of the dynamic data item obtained in a request or response in a current replay session and using that value in a consequent response or request in that session.

4. The method of claim 1, wherein the comparing of the recorded scripts comprises employing string comparison or HTML comparison.

5. The method of claim 1, further comprising prompting an operator to perform the separate iterations with the tested application.

6. The method of claim 1, further comprising presenting the correlation value to the user.

7. A non-transitory computer readable medium having stored thereon instructions for determining a dynamic data item to be used in a replayable testing script for iterative use by an automated testing utility, which when executed by a processor cause the processor to perform the method of:
   recording a plurality of scripts, each script relating to a separate iteration of a transaction between a user and a tested application performed by an operator, each script comprising a request and a response;
   automatically comparing the recorded scripts to identify a location of a suspected correlation value by identifying a suspected correlation values in a request in a script that corresponds to the response in which that suspected correlation value was found; and
   determining whether the suspected correlation value is a correlation value to be replaced by a variable parameter, indicative of a dynamic data item.

8. The non-transitory computer readable medium of claim 7, wherein the method further comprises generating the replayable testing script comprising one of the recorded scripts and having a variable parameter at the identified location of the dynamic data item.

9. The non-transitory computer readable medium of claim 7, wherein the method further comprises replaying the replayable testing script to test the tested application.

10. The non-transitory computer readable medium of claim 9, wherein the method further comprises retrieving an assigned value of the dynamic data item obtained in a request or response in a current replay session and using that value in a consequent response or request in that session.

11. The non-transitory computer readable medium of claim 7, wherein the method further comprises prompting an operator to perform the separate iterations with the tested application.

12. The non-transitory computer readable medium of claim 7, wherein the method further comprises presenting the correlation value to the user.

13. A system for automated testing of an application, the system including a testing server comprising:
- a processor to record two or more scripts, each script relating to a separate iteration of a transaction between a user and a tested application performed by an operator, each script comprising a request and a response;
- a module to compare the recorded scripts so as to identify a number of locations in each script, each such location having a different value at that location than in a corresponding location in another of the recorded scripts, indicative of a dynamic data item and identifying one of the suspected correlation values in a request in a script that corresponds to the response in which that suspected correlation value was found and determining that suspected correlation value to be a correlation value; and
- the module to generate a replayable testing script based on one of the recorded scripts by automatically inserting a variable parameter at each of the identified locations within the testing script.

14. The system of claim 13, wherein the processor is configured, when comparing the recorded scripts to employ string comparison or HTML comparison.

15. The system of claim 13, wherein the processor is further configured to prompt an operator to perform the separate iterations with the tested application.

16. The system of claim 13, wherein the processor is further configured to present the correlation value to the user.

17. The system of claim 13, further comprising a module for generating the replayable testing script for iterative use, the module configured to compare the recorded scripts to identify the location of the data item and to generate the replayable testing script.

* * * * *